FIG. 1-B

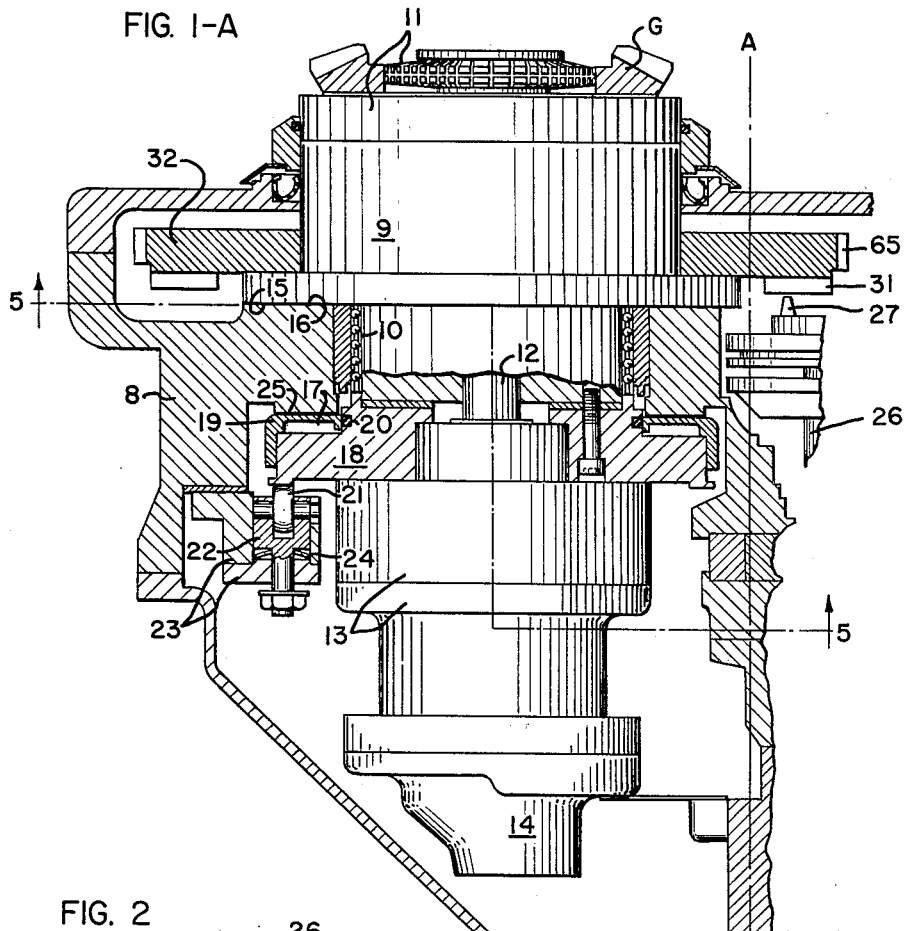
FIG. 1-A
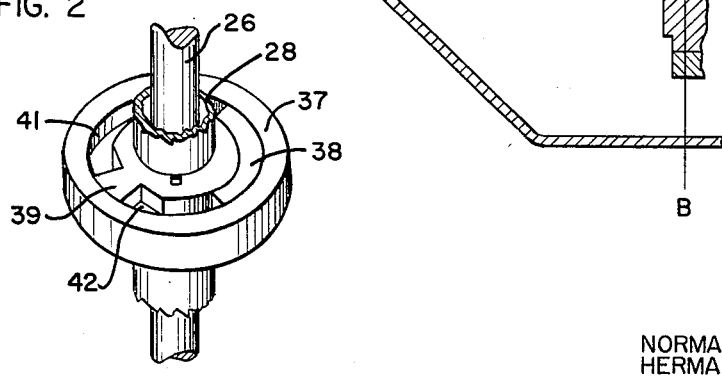
FIG. 2
INVENTORS
NORMAN W. FOWLER
HERMAN A. MALE
BY Richard W. Treverton
ATTORNEY

United States Patent Office 3,166,954
Patented Jan. 26, 1965

3,166,954
INDEX MECHANISM
Norman W. Fowler and Herman A. Male, Rochester, N.Y., assignors to The Gleason Works, Rochester, N.Y., a corporation of New York
Filed Feb. 6, 1961, Ser. No. 87,314
12 Claims. (Cl. 74—822)

The present invention relates to an intermittent index mechanism adapted especially but not exclusively for gear cutting machines, its primary objective being a mechanism capable of accurate and rapid indexing.

A mechanism according to one aspect of the invention comprises a spindle journaled in a housing for rotation and axial motion, the housing having a seat engaged by the spindle in its inward limit position of axial motion, and pressure operated means for clamping the spindle to the seat for the work operation of the machine and moving it axially away from the seat for indexing, characterized by said pressure operated means comprising spring-backed rollers supported by the housing and engaging the spindle for moving it axially away from the seat and supporting it for rotation, and an annular chamber for fluid provided between the housing and the spindle and into which fluid may be introduced under pressure for clamping the spindle against the seat in opposition to the pressure exerted against the spindle by said spring-backed rollers, said fluid chamber being between a face of the spindle and a resilient ring which has a peripheral portion thereof secured to the spindle, said ring in the unflexed condition thereof being spaced from the housing in a direction axial of the spindle and being adapted to be flexed into contact with the housing upon expansion of the chamber by fluid under pressure.

A mechanism according to another aspect of the invention comprises a housing, a driven member rotatable in the housing, a drive member rotatable in the housing and having a drive pin for engagement in radial slots in the driven member, the drive member being movable forwardly and rearwardly along its rotation axis to bring the pin respectively into and out of the plane of the slots, a first fluid motor to effect forward and return rotations of the drive member respectively to rotatably advance the drive member and to return, a second fluid motor to effect such axial reciprocation, and valve means for controlling said motors to cause an axial stroke of the drive member to precede each rotary motion thereof, and vice versa.

A mechanism according to still another aspect of the invention comprises a housing, a member to be indexed rotatably supported by the housing and a notched index plate secured to said member, an index pawl movable on the housing to engage and disengage a notch of the index plate, a lifting cam for the pawl rotatable on the housing, a seating cam for the pawl co-rotatable with the lifting pawl, a lever and a spring arranged between the pawl seating cam and the pawl, and a member fulcrumming the lever and adjustable on the housing from and toward the pawl and seating cam to release and apply the lever and spring.

A preferred embodiment of the invention, designed for a bevel gear cutting machine, is shown in the accompanying drawings, wherein;

FIGS. 1–A and 1–B are the left and right parts of a vertical sectional view through the mechanism, in plane 1—1 of FIG. 5, the dividing line between the parts being designated A—B;

FIG. 2 is a perspective sectional view of the motor for rotating the index drive member;

Figure 4:
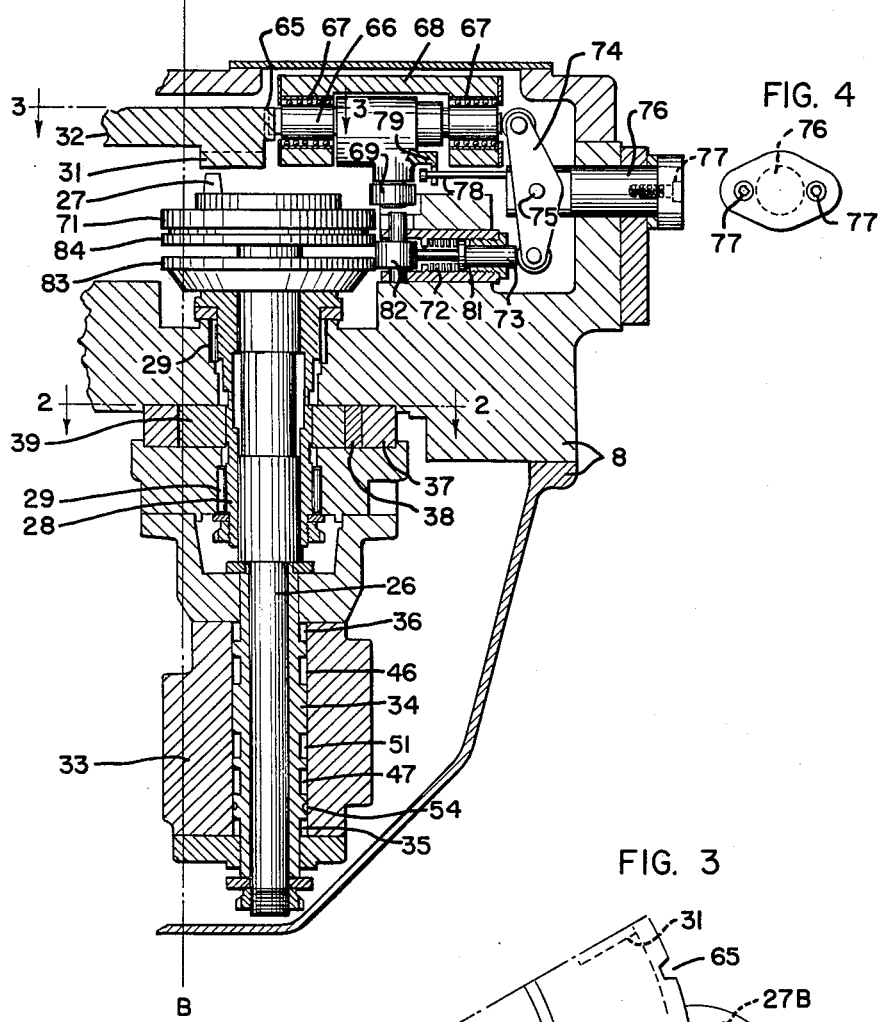
FIG. 4 is a detail view in a vertical plane perpendicular to the plane of FIG. 1–B.

The mechanism includes a housing 8 in which a spindle 9 is rotatable and axially movable on a ball-sleeve bearing 10, the spindle supporting a chuck 11 for a bevel ring gear G. The chuck is applied and released hydraulically by a piston which is connected to draw rod 12 of the chuck and is reciprocable in a cylinder 13. Hydraulic pressure is applied to the cylinder through a stationary distributor 14 to which the cylinder is rotatably connected. In the lower limit position of the spindle, its face 15 abuts a face 16 of the housing. The spindle is clamped to the housing in this position by hydraulic pressure applied to an annular chamber 17 formed between lower part 18 of the spindle and a resilient ring 19 whose outer peripheral portion is secured to part 18. The inner peripheral portion of ring 19 is movable relative to part 18 but is in fluid-tight relation thereto by the provision of an O-ring seal 20.

Figure 5:
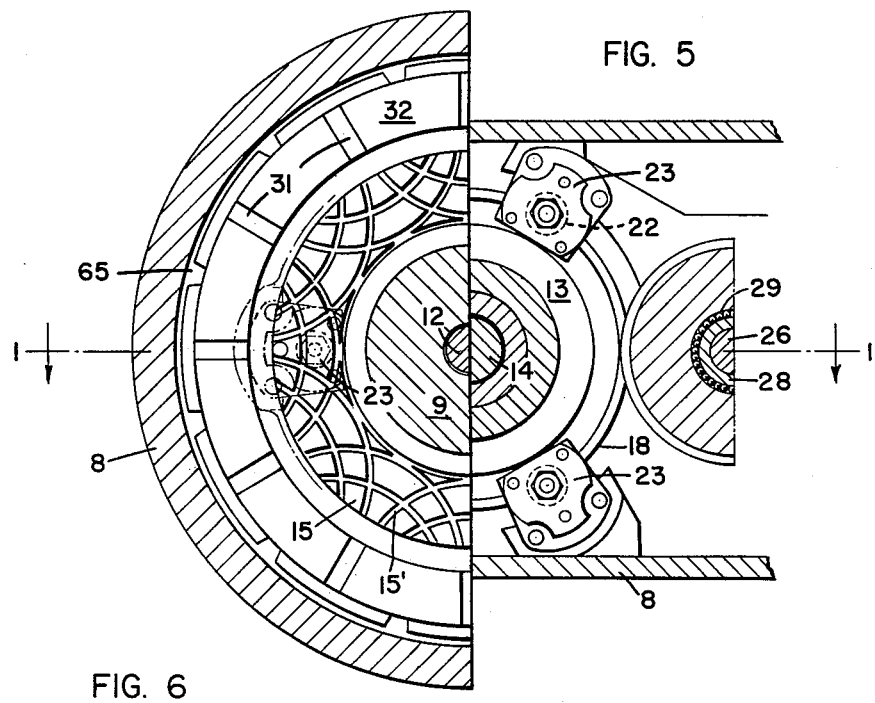
FIG. 5 is a horizontal sectional view in plane 5—5 of FIG. 1–A.

In the absence of pressure in chamber 17 the spindle is elevated slightly by means of rollers 21, each of which is supported by a clevis 22 slidable vertically in a supporting part 23 of the housing and backed by a Belleville spring 24. The rollers engage the lower surface of part 18 and by pressure of the springs elevate the spindle enough to establish a slight clearance between faces 15 and 16. Even in the elevated position of the spindle there is a slight clearance at 25, between the upper surface of the ring 19 and the surface of the housing 8 thereabove. In this condition the spindle is freely rotatable on the bearing 10 and rollers 21 for the indexing of gear G to bring successive tooth spaces thereof into cutting position. When pressure is applied to chamber 17 the ring 19 is flexed upwardly to eliminate the clearance 25, and the spindle is pressed downwardly against the resistance of the springs 24 to clamp the faces 15 and 16 together. As shown in FIG. 5 the face 15 of the spindle is provided with grooves 15′ to allow rapid displacement of any lubricant oil that may be thrown onto the faces 15, 16 by adjacent rotating parts of the mechanism.

Indexing rotation of the spindle is effected by a drive member comprising a shaft 26 and a pin 27. The shaft is keyed for axial motion to a sleeve 28, FIG. 1–B, that is rotatably supported in the housing 8 on bearings 29. When the drive member is in its upper position of axial motion the pin 27 is engageable in radial slots 31 of an index plate 32 which is detachably secured to the spindle 9. The slots 31 correspond in number and angular pitch to the tooth number and pitch of the gear G.

Figure 3:
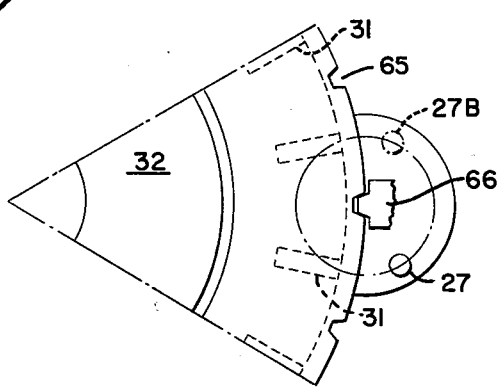
FIG. 3 is a fragmentary detail view in plane 3—3 of FIG. 1–B.

The drive member 26, 27 is shifted axially in sleeve 28 by a hydraulic motor comprising a cylinder 33 secured to the housing 8 and a piston 34 secured to shaft 26. Hydraulic pressure when applied to motor chamber 35 raises the piston and drive member, and when applied to motor chamber 36 lowers them. Rotation of the drive member is effected by a vane-type hydraulic motor comprising a cylinder 37 secured to the housing 8 which has a stationary vane 38, and a vane piston 39 secured to sleeve 28. Application of pressure to motor chamber 42 causes the vane piston and the drive pin to swing clockwise, in FIGS. 2 and 3, while application to motor chamber 41 causes them to swing counterclockwise.

Figure 6:
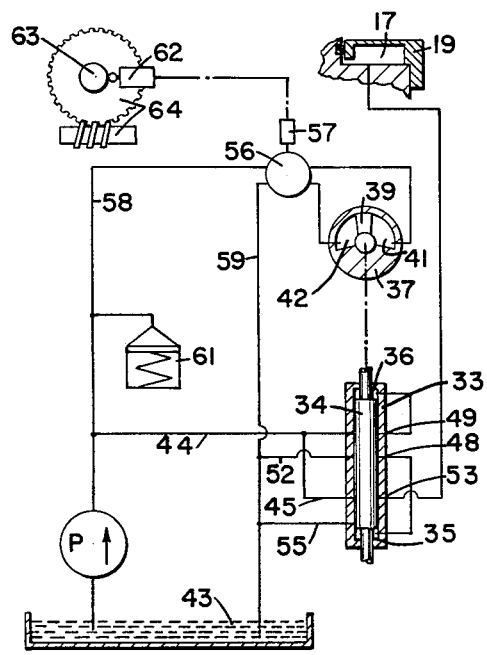
FIG. 6 is a hydraulic diagram.
Figure 7:
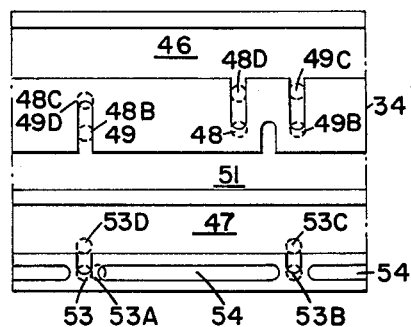
FIG. 7 is a development of a valve shown in FIGS. 1–B and 6.

The piston 34 is rotated with the shaft 26 by the vane piston, and constitutes a valve which controls its own reciprocating motion, to the end that a stroke of piston 34 follows upon the completion of each stroke or swing of the vane piston. The piston 34 also constitutes a valve for controlling the application of pressure to the clamp chamber 17. Referring to FIGS. 6 and 7, a pump P draws hydraulic fluid from a sump 43 and pumps it through lines 44 and 45 to ports in cylinder 33 which open respectively into grooves 46 and 47 in the piston 34 in all positions of the latter. From groove 46 the fluid may pass into one port 48 or 49 in the cylinder, these ports leading respectively to motor chambers 35 and 36. Exhaust flow through the other port, 49 or 48, is through groove 51 in the piston, which is in constant communication with a port in the cylinder connected to return line 52 to the sump. In some positions of piston 34 fluid may pass from groove 47 through port 53 into a passage leading to clamp chamber 17 and in other piston positions fluid may exhaust from the clamp chamber through the port 53 into one of grooves 54 which both are always open into a port in the cylinder connected to return line 55 to the sump.

A reversing valve 56 for controlling vane motor 37, 39 is operated by a solenoid 57 and is adapted to connect either pressure line 58 or exhaust line 59 to motor chamber 41, and simultaneously to connect the other of these lines to motor chamber 42. A mechanical pressure accumulator 61 preferably is connected in line 58 to enable rapid forward operation of the vane piston with a pump P of relatively small capacity. Solenoid 57 is controlled by a switch 62 operated by a cam 63 driven by a suitable motor, not shown, through reduction gearing 64. In the particular gear cutting machine of which the present index mechanism is a part, the cam is on the cutter spindle and is arranged to act through the solenoid to effect an indexing cycle during each revolution of the cutter, at a time when a gap between the last and first blades of the cutter is abreast of the work gear G. In each such indexing cycle the following phases occur in sequence:

Phase I, during which gear cutting occurs. Valve 56 connects chamber 41 to pressure line 58, holding vane 39 and pin 27 in their counterclockwise limit position, this being the full line position of the pin 27 in FIG. 3. Ports 48, 49 and 53 are in the relation to piston 34 shown in FIG. 7, ports 48 and 49 respectively registering with branches of pressure groove 46 and exhaust groove 51 so that the piston 34 and pin 27 are held in their uppermost positions, and port 53 registering with a branch of pressure groove 47 so that the spindle clamp is applied.

Phase II, at the conclusion of cutting. Switch 62 energizes solenoid 57, causing reversal of valve 56 to connect vane motor chamber 42 to pressure line 58 and thus causing clockwise rotation of vane 39 and pin 27 to commence. Before the pin enters the adjacent slot 31 of the index plate 32, the piston 34 has rotated so that the port 53 is in the relative position shown at 53A in FIG. 7, putting the clamp chamber 17 on exhaust. Continued rotation causes the pin to enter the slot 31 and advance the index plate by one pitch, the terminal position being with the ports in the relative positions designated 48B, 49B and 53B in FIG. 7, and the pin in its clockwise limit position 27B in FIG. 3. Before this terminal position is reached the port 49 is momentarily in registration with a branch of groove 46 (in the relative position designated 48 in FIG. 7), but this does not cause axial motion of piston 34 because at this moment the port 48 is closed.

Phase III, in which indexing is complete and the next cutting cycle of the machine may commence, although the index mechanism has yet to return to its starting position. Port 53 (then at 53B) registers with a branch of pressure groove 47 and applies pressure to chamber 17 to thereby clamp the spindle. Registration of ports 48 and 49 (at 48B and 49B) respectively with branches of the exhaust and pressure grooves 51 and 46 results in piston 34 being lowered, lowering pin 27 out of the horizontal plane of slots 31. The ports are now in the relation to piston 34 shown respectively at 48C, 49C and 53C.

Phase IV. Cam 63 now deenergizes the solenoid 57 which thereupon again reverses valve 56, connecting motor chamber 41 to pressure line 58 and thereby causing motion of vane 39 and pin 27 to their counterclockwise limit positions. The relation of the ports 48, 49 and 53 to piston 34 is then as shown respectively at 48D, 49D and 53D. Before this position is reached the port 49 is momentarily in registration with groove 46 (in the position of port 48 designated 48D), but this does not cause motion of the piston inasmuch as the port 48 is closed at this time.

Phase V. Fluid under pressure applied to chamber 35 through port 48 (at 48D) and exhaust from chamber 36 through port 49 (at 49D) results in raising of the piston 34 and pin 27, restoring the condition described under "Phase I," above.

For accurately positioning and holding the spindle after each indexing operation, the plate 32 is provided about its periphery with notches 65 engageable by an index pawl 66. The pawl is supported for motion, radially of the plate, by ball sleeve bearings 67 in a bracket 68 secured to the housing 8. A roller 69 carried by the pawl is engageable with a pawl lifting cam 71 on the drive shaft 26 when the latter is elevated, but is above the plane of the cam in the lowered position of the shaft, shown in FIG. 1-B. The cam is shaped to lift the pawl out of a notch 65 of the index plate as the pin 27 enters a slot 31 and to allow the pawl to enter a successive notch 65 as the pin leaves the slot. Such entry is complete prior to application of pressure to clamp chamber 17. A spring 72 is provided for engaging the pawl with the plate and holding it engaged until the next indexing action. The spring is arranged to act on a pin 73 which bears on a roller on the lower end of a lever 74, a similar roller on the upper end of the lever bearing on the end of pawl 66.

The lever is fulcrumed at 75 to a stud 76 which is secured to the housing by screws 77, FIGS. 1-B and 4. By releasing these screws and withdrawing the stud the pressure exerted by spring 72 may be removed, allowing manual retraction or removal of the pawl 66 for the purpose of freeing the index plate and spindle, as for example for truing a workpiece or an arbor on the spindle or for exchanging index plates. A headed pin 78 carried by stud 76 is engageable with a fork 79 on the pawl, to retract the pawl when the stud is withdrawn.

The pin 73 on which spring 72 bears is slidable in a sleeve 81 which itself is slidable in the housing 8 and carries a roller 82. The latter is adapted to roll on a cam 83 secured to sleeve 28, and, when the drive shaft is in its lower position, on a cam 84 secured to the shaft. The cams 83, 84 constitute pawl seating cams and are so shaped as to keep the spring 72 compressed sufficiently to hold the pawl 66 firmly engaged with the index plate at all times during operation of the machine except during indexing action, and at that time to allow the cam 71 to disengage the pawl without increase of spring compression.

Having now described a preferred embodiment of the invention, what is claimed is:

1. An index mechanism comprising a housing, a driven member rotatable in the housing, a drive member rotatable in the housing and having a drive pin for engagement in radial slots in the driven member, the drive member being movable forwardly and rearwardly along its rotation axis to bring the pin respectively into and out of the plane of the slots, a first fluid motor to effect forward and return rotary motions of the drive member through a predetermined angle, respectively to rotatably advance the driven member and to return, a second fluid motor to effect said axial reciprocation, and valve means for controlling said motors to cause an axial stroke of the drive member to precede each rotary motion thereof, and a rotary motion thereof to precede each axial stroke thereof.

2. A mechanism according to claim 1 in which the valve means comprise a reversing valve for the first motor for causing forward and return strokes of the latter, and a reversing valve for the second motor operated by the first motor to effect a forward axial stroke of the drive member at the conclusion of each return rotation thereof and a return axial stroke at the conclusion of each forward rotation thereof.

3. A mechanism according to claim 1 having an index pawl movable on the housing to engage and disengage index notches on the driven member, and means operable by said drive member for moving the pawl in time therewith.

4. A mechanism according to claim 3 in which the means for moving the pawl comprises a pawl lifting cam and a pawl seating cam on the drive member, a lever and a spring arranged between the pawl seating cam and the pawl, and a member fulcrumming the lever and adjustable on the housing from and toward the pawl and seating cam respectively to release and apply the lever and spring.

5. An index mechaninm comprising a housing, a member to be indexed rotatably supported by the housing and a notched index plate secured to said member, an index pawl movable on the housing to engage and disengage a notch of the index plate, a lifting cam for the pawl rotatable on the housing, a seating cam for the pawl co-rotatable with the lifting pawl, a lever and a spring arranged between the pawl seating cam and the pawl, and a member fulcrumming the lever and adjustable on the housing from and toward the pawl and seating cam to release and apply the lever and spring.

6. An index mechanism according to claim 5 having a connection between said member and the pawl for lifting the latter from engagement with the index plate upon continued adjustment of said member away from the pawl and seating cam subsequent to such release.

7. An index mechanism for a spindle of a machine tool, said spindle being journaled in a housing for rotation and axial motion, the housing having a seat engaged by the spindle in its inward limit position of axial motion, and pressure operated means for clamping the spindle to the seat for the work operation of the machine and moving it axially away from the seat for indexing, characterized by said pressure operated means comprising spring-backed rollers suported by the housing and engaging the spindle for moving it axially away from the seat and supporting it for rotation, and an annular chamber for fluid provided between the housing and the spindle and into which fluid may be introduced under pressure for clamping the spindle against the seat in opposition to the pressure exerted against the spindle by said spring-backed rollers, said fluid chamber being between a face of the spindle and a resilient ring which has a peripheral portion thereof secured to the spindle, said ring in the unflexed condition thereof being spaced from the housing in a direction axial of the spindle and being adapted to be flexed into contact with the housing upon expansion of the chamber by fluid under pressure.

8. A mechanism according to claim 7 in which said fluid chamber is between a face of the spindle and a resilient ring having a peripheral portion thereof secured to the spindle, said ring in the unflexed condition thereof being spaced from the housing in a direction axial of the spindle and being adapted to be flexed into contact with the housing upon expansion of the chamber by fluid under pressure.

9. A mechanism according to claim 7 in which there is a drive member rotatable in the housing and engageable with the spindle for intermittently rotating it, a fluid pressure motor for rotating the drive member for effecting rotational advance of the spindle. and valve means co-ordinating said motor with the release and application of pressure to said chamber, to cause the spindle to be moved away from said seat prior to each such advance of the spindle and to be clamped against said seat at the conclusion of each such advance.

10. A mechanism according to claim 9 in which said motor is arranged to rotate the drive member back and forth, and there is a piston adapted to reciprocate the drive member axially, said drive member having a pin arranged for engagement in radial slots in the spindle in one axial limit position and being free thereof in the opposite limit position, and valve means coordinating operation of the motor and piston to cause rotational and axial strokes of the driven member to alternate, to thereby effect unidirectional indexing of the spindle.

11. A mechanism according to claim 10 in which said piston is movable in unison with the drive member in a cylinder in the housing, and the piston and cylinder have cooperating valve ports which constitute said valve means for coordinating the operation of the motor and piston.

12. A mechanism according to claim 11 in which said piston and cylinder also have cooperating valve ports which constitute said valve means for coordinating the motor with the release and application of pressure to said chamber.

References Cited in the file of this patent

UNITED STATES PATENTS

| | | |
|---|---|---|
| 2,233,950 | Lepetit | Mar. 4, 1941 |
| 2,461,631 | Darash | Feb. 15, 1949 |
| 2,900,849 | Hutchens et al. | Aug. 25, 1959 |
| 2,979,971 | Darash | Apr. 18, 1961 |
| 3,006,205 | Platt | Oct. 31, 1961 |
| 3,028,762 | Stutz | Apr. 10, 1962 |
| 3,049,017 | McDonald | Aug. 14, 1962 |
| 3,064,499 | Bullard | Nov. 20, 1962 |
| 3,118,347 | Thompson | Jan. 21, 1964 |